May 24, 1938.  C. F. ALLISON  2,118,134
COLLAPSIBLE BLIND OR SHADE
Filed Nov. 17, 1937
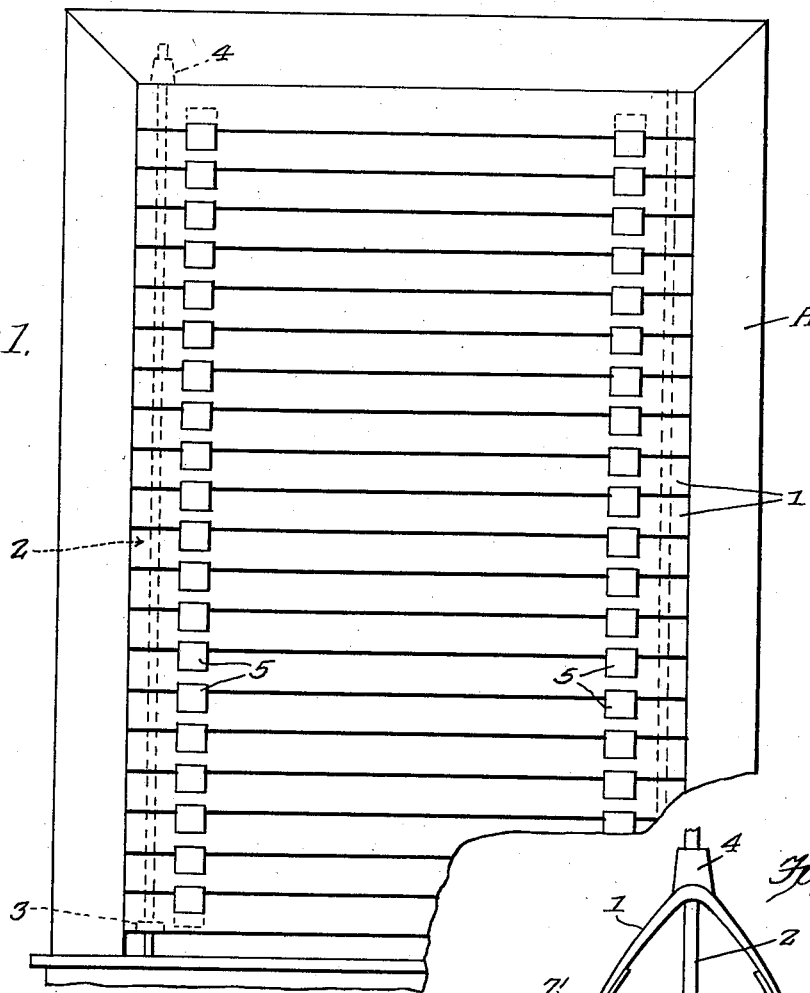
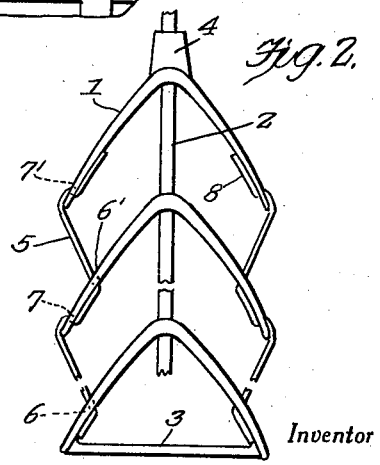
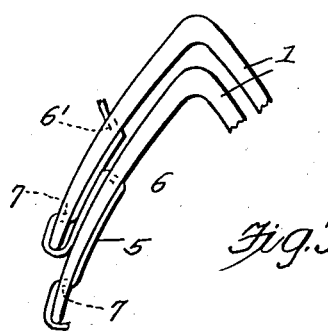
Inventor
Charles F. Allison,
By Clarence A. O'Brien
Hyman Berman
Attorneys Patented May 24, 1938

2,118,134

UNITED STATES PATENT OFFICE 2,118,134

COLLAPSIBLE BLIND OR SHADE

Charles Fred Allison, Corpus Christi, Tex.

Application November 17, 1937, Serial No. 175,151

2 Claims. (Cl. 156—16)

This invention relates to a blind or shade for use in windows, doors, etc., the general object of the invention being to provide means which will permit the entrance of air and diffused light, when the device is in operated position, but which will keep out the direct rays of light, with means whereby the device can be collapsed, by a sliding motion, so that it will occupy but little space when in inoperative position.

This invention also consists in certain other features of construction and in the combination and arrangement of several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a front view showing the invention in use as a blind or shade for a window.

Figure 2 is a fragmentary end view showing the device in open or operative position.

Figure 3 is an end view showing a pair of the slats in closed position, this view being exaggerated to show how the tape is arranged relative to the slats.

As shown in these views, the device is composed of a plurality of slats 1 each of which is of substantially inverted V-shape though the upper and lower surfaces of the slats are rounded slightly, as shown in Figures 2 and 3, so that the slats will closely nest together when the blind is collapsed or moved to inoperative position. The slats are slidably arranged on the rods 2 which are vertically arranged in the opening of the window A, or other opening, the rods passing through holes in the apexes of the slats. The lower slat is formed with cross bars 3 through which the rods pass and the upper slat is formed with an upstanding projection 4 for each rod so as to prevent tilting movement of the slats and to hold the slats perpendicular.

The slats are connected together by the pairs of tapes 5, each of which has its ends connected to the upper and lower slats respectively, as shown in Figure 2. Each tape passes through a hole 6 in the bottom slat, the hole being spaced a short distance from the lower end of each limb of the slat and then the tape passes upwardly around the lower end of each limb of the next slat above and then the tape passes inwardly through a hole 7 located slightly above said lower end, the tape then passing upwardly along a portion of the inner face of each limb and then passing outwardly through a hole 6' in the limb, located above the hole 7. Then the tape passes through the other intermediate slats in the same manner to the top slat. It passes over the lower end of each limb of the top slat and through a hole 7' therein with the end of the tape suitably fastened to the inner portion of each limb of the top slat as shown at 8.

Thus, when the blind is in operative position the slats will be spaced apart, as shown in Figure 2, with portions of the tapes extending upwardly and outwardly from one slat to the next, but when the blind is in collapsed or inoperative position the slats nest together and the tapes fold between the slats as shown in Figure 3. As before stated this Figure 3 is an exaggerated view to more clearly show the position taken by the tape. In actual practice, the tapes are so thin that the slats are closer together than shown in this figure.

As will be seen in Figure 2 the tapes are so constructed and arranged that when the device is in operative position the slats will be supported by the tapes with the apex or upper end of each slat slightly entering the space formed by the next slat or in other words the apex of a lower slat is above the plane of the lower ends of the limbs of the next slat above. This will prevent the entrance of the direct rays of light through the blind but will permit the passage of air and diffused light. Any suitable means may be used for moving the blind to inoperative position such as cords and pulleys and the device can be raised to inoperative position from the bottom of the window or other opening or it can be lowered into inoperative position from the top of the opening.

It is thought from the foregoing description that the advantages and novel features of the invention will be readily apparent.

It is to be understood that changes may be made in the construction and in the combination and arrangement of the several parts, provided that such changes fall within the scope of the appended claims.

Having described the invention, what is claimed as new is:—

1. A blind or shade of the class described comprising a plurality of slats of substantially inverted V-shape, rods on which the slats are slidably arranged and tapes connecting the slats together, said tapes being so constructed and arranged as to hold the slats, when the device is in operative position, with the apex of a lower slat above the plane of the lower end of the next slat above and said tapes folding upon the slats when the blind is collapsed or in inoperative position, and means carried by the upper and lower slats for preventing tilting movement of the slats on the rods, said means including cross pieces connecting the limbs of the lower slat together and having holes therein through which the rods pass and tubular parts at the top of the upper slat through which the rods pass.

2. In a blind of the class described, a plurality of vertically arranged rods, a plurality of slats slidably arranged on the rods, the rods passing through the apexes of the slats, each slat being of substantially inverted V-shape with its upper and lower surfaces slightly rounded and a plurality of pairs of tapes connecting the slats together, each tape having one end connected with the upper slat and its other end connected with the lower slat, the tape passing outwardly around the lower end of one limb of a slat inwardly through said limb slightly above the lower end, the tape then passing upwardly along a portion of the inner face of the limb and then outwardly through the limb an appreciable distance above the lower end of said limb and then passing to the next slat above.

CHARLES F. ALLISON.